US012617336B2

(12) United States Patent
Wu et al.

(10) Patent No.: US 12,617,336 B2
(45) Date of Patent: May 5, 2026

(54) TOW LIGHT BRACKET CONFIGURATION

(71) Applicant: Master Tailgaters, LLC, La Puente, CA (US)

(72) Inventors: Joseph Wu, Glendora, CA (US); Adam Wu, Glendora, CA (US); Aaron Wu, Glendora, CA (US)

(73) Assignee: Master Tailgaters, LLC, La Puente, CA (US)

( * ) Notice: Subject to any disclaimer, the term of this patent is extended or adjusted under 35 U.S.C. 154(b) by 0 days.

(21) Appl. No.: 19/022,777

(22) Filed: Jan. 15, 2025

(65) Prior Publication Data

US 2025/0242748 A1     Jul. 31, 2025

Related U.S. Application Data

(60) Provisional application No. 63/627,694, filed on Jan. 31, 2024.

(51) Int. Cl.
| | |
|---|---|
| *B60Q 1/30* | (2006.01) |
| *B60Q 1/00* | (2006.01) |
| *B60Q 1/26* | (2006.01) |
| *B60R 1/26* | (2022.01) |
| *F21V 21/30* | (2006.01) |

(52) U.S. Cl.
CPC .......... *B60Q 1/305* (2013.01); *B60Q 1/0023* (2013.01); *B60Q 1/2615* (2013.01); *B60R 1/26* (2022.01); *F21V 21/30* (2013.01); *B60Q 2900/30* (2013.01)

(58) Field of Classification Search
CPC .... B60Q 1/305; B60Q 1/0023; B60Q 1/2615; B60Q 2900/30; B60R 1/26; F21V 21/30

USPC ....... 362/505, 506, 523, 529, 531, 549, 397, 362/398

See application file for complete search history.

(56) References Cited

U.S. PATENT DOCUMENTS

| | | | | |
|---|---|---|---|---|
| 4,506,317 | A * | 3/1985 | Duddy | F21V 21/0965 362/426 |
| 4,734,675 | A * | 3/1988 | Wen | B60Q 1/302 248/161 |
| 5,003,289 | A * | 3/1991 | Roman | B60Q 1/26 362/540 |
| 7,020,992 | B1 * | 4/2006 | Christie | G09F 21/04 40/593 |
| 2006/0061991 | A1 * | 3/2006 | Yeh | F21L 4/00 362/427 |
| 2014/0307460 | A1 * | 10/2014 | Li | B60Q 1/2615 362/523 |
| 2016/0167568 | A1 * | 6/2016 | Salami, Jr. | B60Q 1/0088 362/543 |
| 2016/0341407 | A1 * | 11/2016 | Manfred | F21V 21/0965 |
| 2017/0240125 | A1 * | 8/2017 | Weigert | B60R 16/023 |
| 2021/0061166 | A1 * | 3/2021 | Davis | B60R 1/26 |

* cited by examiner

*Primary Examiner* — Laura K Tso
(74) *Attorney, Agent, or Firm* — LeonardPatel PC; Sheetal S. Patel; Michael A. Leonard, II

(57) ABSTRACT

A tow light bracket configuration includes a housing configured to house one or more lights and a camera, one or more upper bracket portions with respective rotating axes to permit the housing to maneuver to a position, and one or more lower bracket portions affixed to the upper bracket portions to provide a rotating axis for the housing to maneuver into the position. The one or more lights are on both sides of the camera.

10 Claims, 12 Drawing Sheets

1055

1050

TOW LIGHT BRACKET CONFIGURATION

CROSS REFERENCE TO RELATED APPLICATION

This application claims the benefit of, and priority to, U.S. Provisional Application Ser. No. 63/627,694, filed on Jan. 31, 2024. The entirety of the subject matter of the earlier filed application is incorporated into this application.

FIELD

The present invention relates to a tow light and, more particularly, to a detachable tow light that is on a bracket and can be dynamically placed or removed from the rear portion of a vehicle.

BACKGROUND

The addition of a trailer or other type of vehicle may require a tow light be placed on the back of the vehicle to prompt other vehicles on the road about braking or other vehicle maneuvers. A tow light may be installed as a permanent fixture, however, the use of a tow light may be intermittent and may not require permanent installation in one location.

Accordingly, an improved dynamic tow light configuration may be beneficial.

SUMMARY

Certain embodiments of the present invention may provide solutions to the problems and needs in the art that have not yet been fully identified, appreciated, or solved by current surgical tow light technologies. For example, some embodiments of the present invention pertain to a dynamic tow light configuration.

One example may include a housing configured to house one or more lights and a camera, one or more upper bracket portions with respective rotating axes to permit the housing to maneuver to a position, and one or more lower bracket portions affixed to the upper bracket portions to provide a rotating axis for the housing to maneuver into the position, and the one or more lights are on both sides of the camera.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION

Some embodiments may simplify the process of placing a light on rear area of a vehicle during a tow operation or related roadway use configuration.

Figure 1:
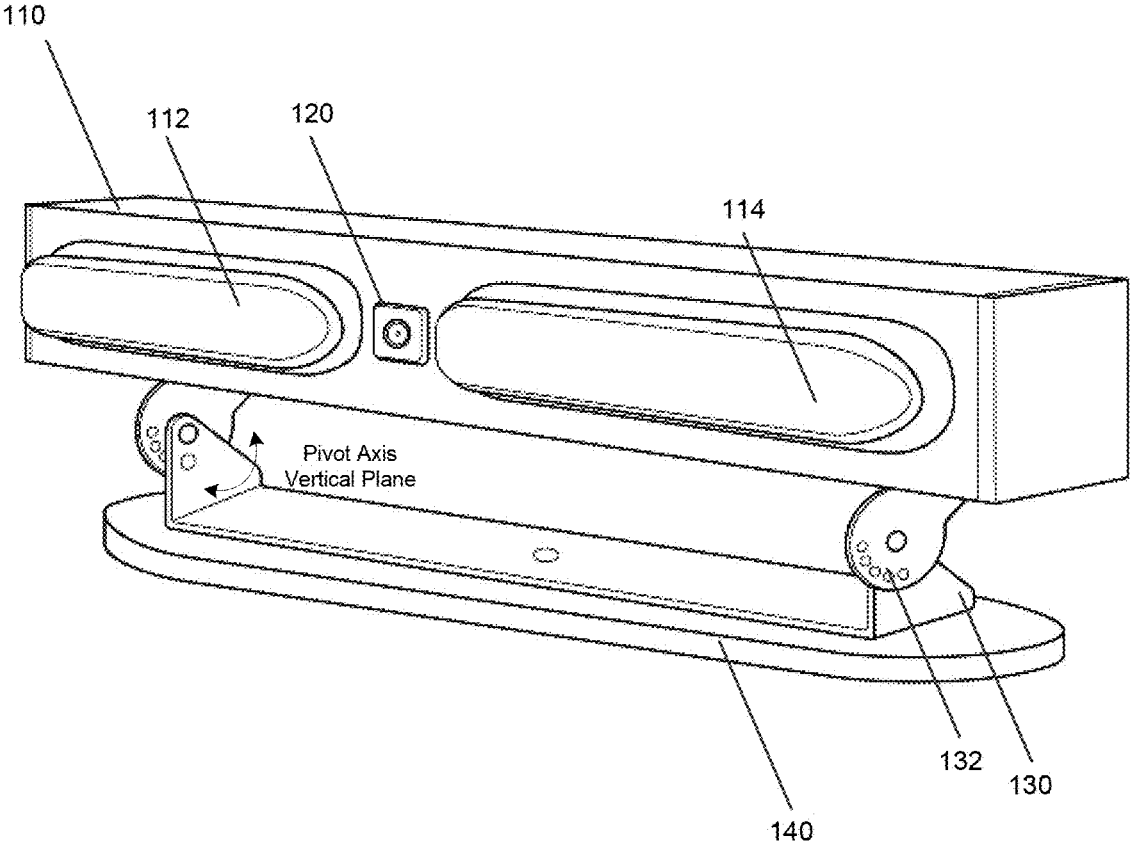
FIG. 1 illustrates a pair of tow lights and a camera mounted on a single bracket according to example embodiments.

FIG. 1 illustrates a pair of tow lights 112, 114 and a camera mounted on a single bracket, according to an embodiment of the present invention. In FIG. 1, light and camera housing 110 includes a pair of lights 112 and 114, which are wired to a power source (not shown) via conduits that run inside camera housing 110 to an exit point or to a battery inside camera housing 110. Pair of lights 112 and 114 may have a camera 120 disposed between lights 112 and 114. In these embodiments, lights 112 and 114 may be wired via a conduit for power to a battery and may provide a content feed via one or more conduits disposed inside camera housing 110 or via a wireless transmitter. The content from camera 120 may be transmitted wirelessly to a receiver mounted in the tailgate control interface of the vehicle and/or a receiver disposed inside the vehicle near a monitor interface inside the vehicle. Housing 110 is affixed to a rotating axis of an upper bracket portion 132, which is affixed to a lower bracket portion of a mount bracket 130. Mount bracket 130 in these embodiments may be affixed to base 140. Housing (e.g., wireless tow light) 110 with brackets (130, 132) can rotate or pivot on an axis and may have no camera. In some additional embodiments, the wireless tow light may have a camera without a bracket rotating about an axis. Yet, in some other embodiments, the wireless tow light may rotate about an axis bracket with a camera. In some further embodiments, bracket 132 allows tow light bar 110 (of FIG. 1) to pivot on a pivot axis that is on a vertical plane.

An example embodiment may include a housing configured to house one or more lights and a camera, one or more upper bracket portions with respective rotating axes to permit the housing to maneuver to a position, and one or more lower bracket portions affixed to the upper bracket portions to provide a rotating axis for the housing to maneuver into the position. In such an embodiment, the one or more lights are on both sides of the camera.

Figure 2:
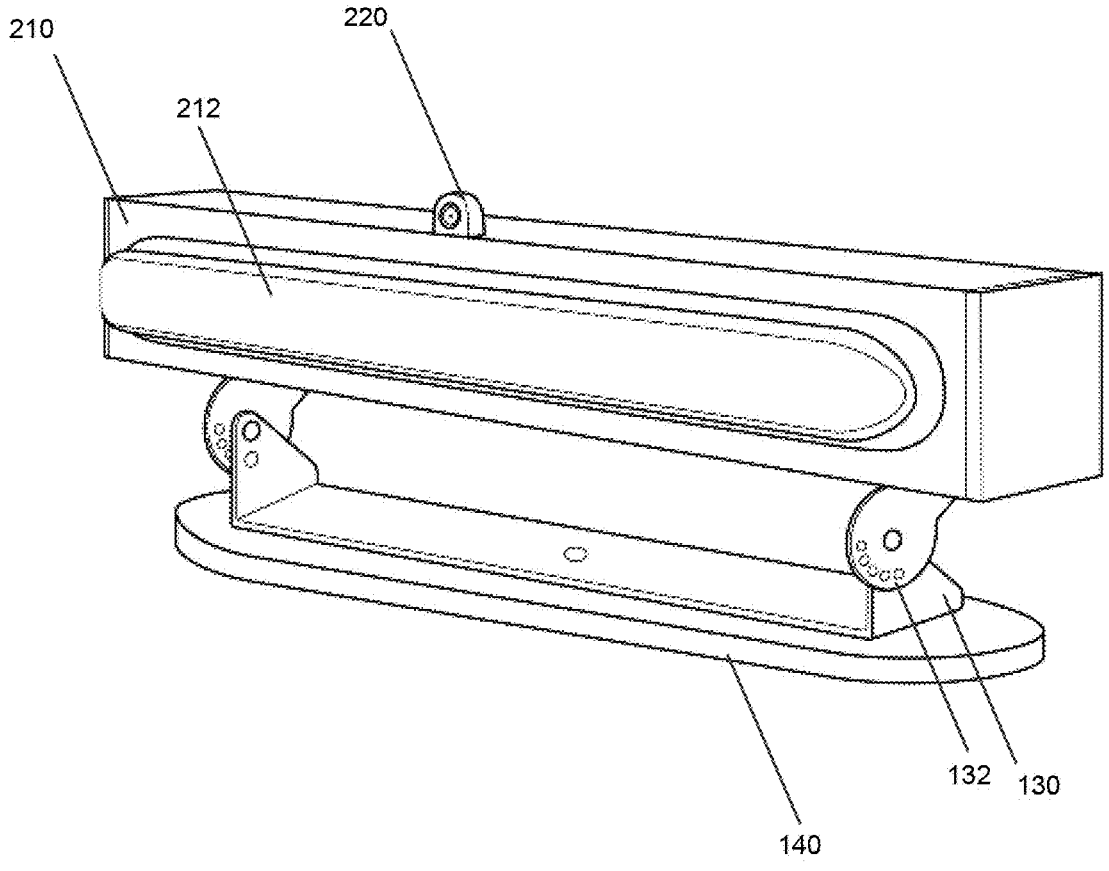
FIG. 2 illustrates a single tow light and a camera mounted on a single bracket according to example embodiments.

FIG. 2 illustrates a single tow light 212 and a camera 220 mounted on a single bracket, according to an embodiment of the present invention. Referring to FIG. 2, housing 210 includes a single slot for single light 212, which traverses a majority of the length of housing 210. Camera 220, in this example, is disposed on the top portion of housing 210 above light 212. The mount, pivoting axes, and the base portions are similar to the embodiment shown in FIG. 1.

Figure 3:
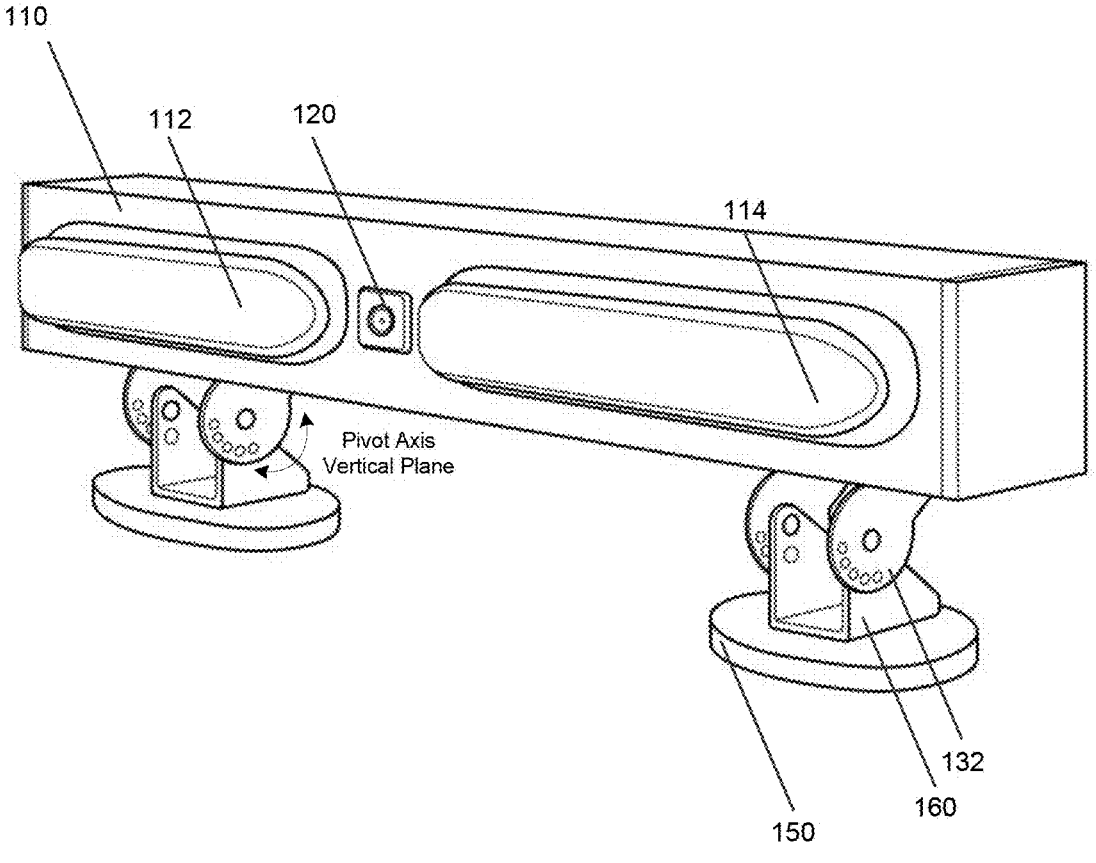
FIG. 3 illustrates a pair of tow lights and a camera mounted on a pair of brackets according to example embodiments.
Figure 9:
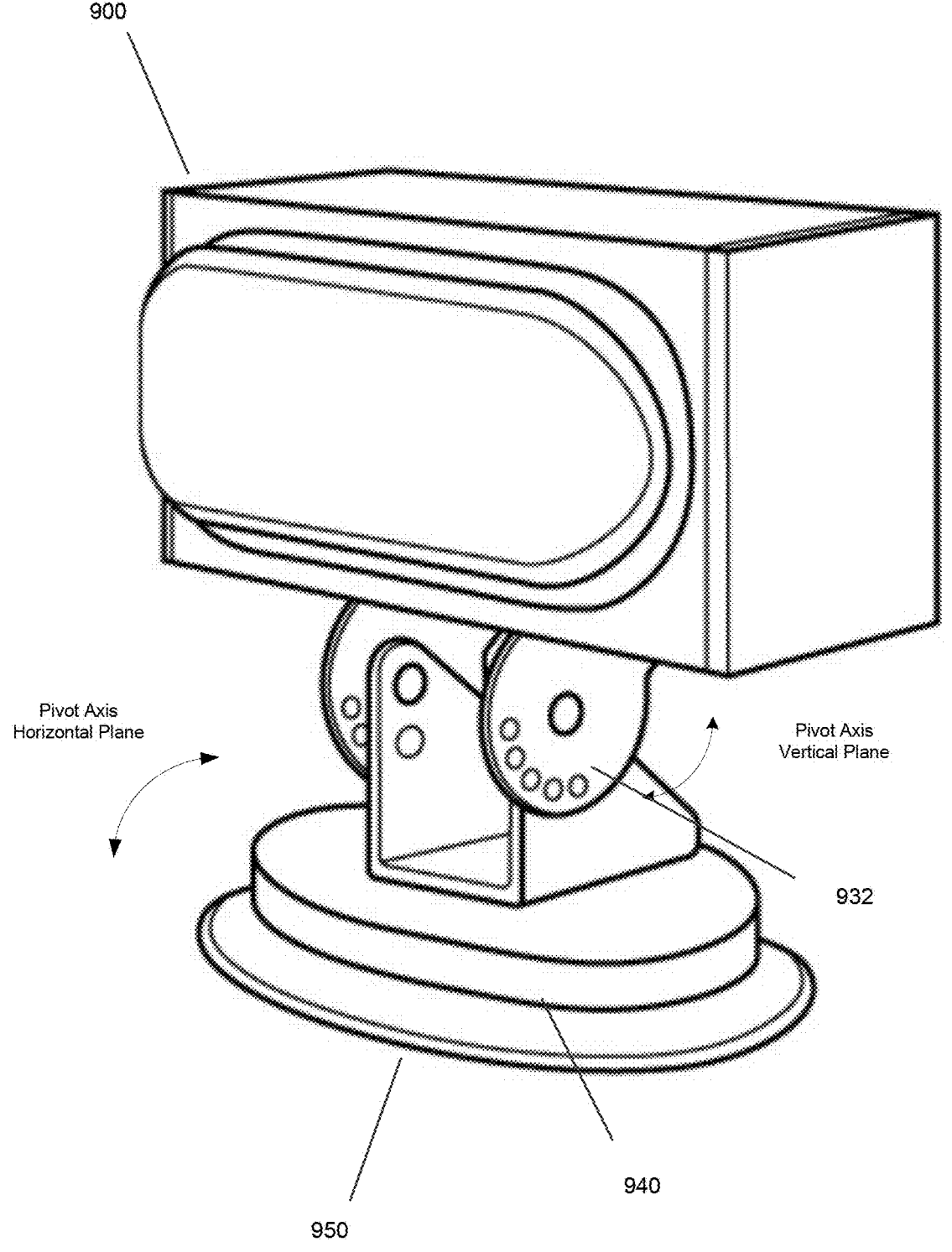
FIG. 9 illustrating a tow light using cups and/or magnets, according to an embodiment of the present invention.

FIG. 3 illustrates a pair of tow lights 112, 114 and a camera 120 mounted on a pair of brackets, according to an embodiment of the present invention. Referring to FIG. 3, the mount includes two separate mount sections 150 with rotating axes 132 being affixed to separate mount brackets 160; separate mount brackets 160 being mounted on separate bases 150. For components 150, 160 and 132, those elements could be suction cups instead of magnets or both suction cups and magnets in a hybrid configuration. See, for example, FIG. 9 illustrating a tow light 900 using cups and/or magnets 950, according to an embodiment of the present invention.

Figure 10A:
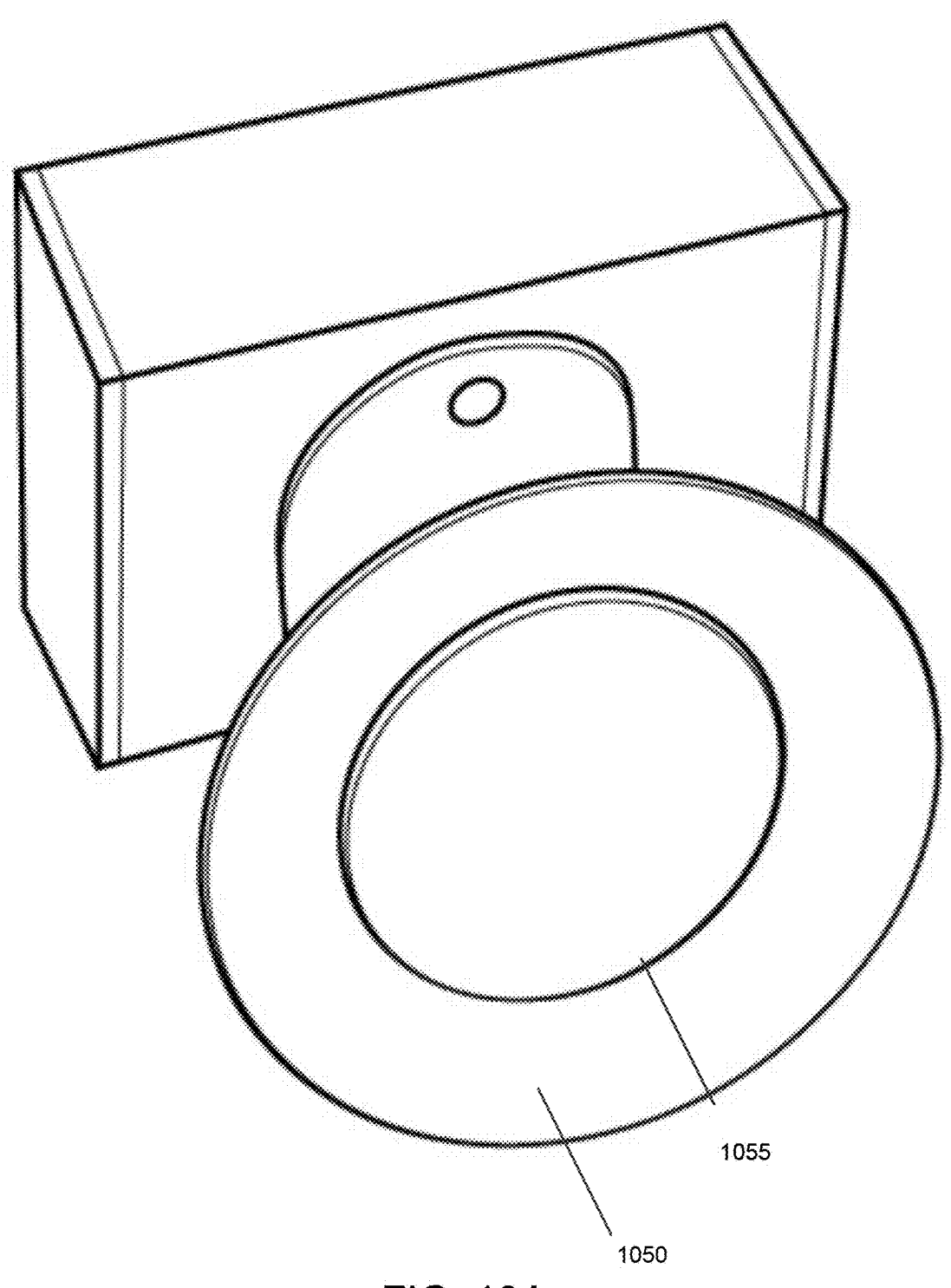
FIGS. 10A and 10B illustrating a suction cup and magnet for tow light system of FIG. 1, according to an embodiment of the present invention.
Figure 10B:
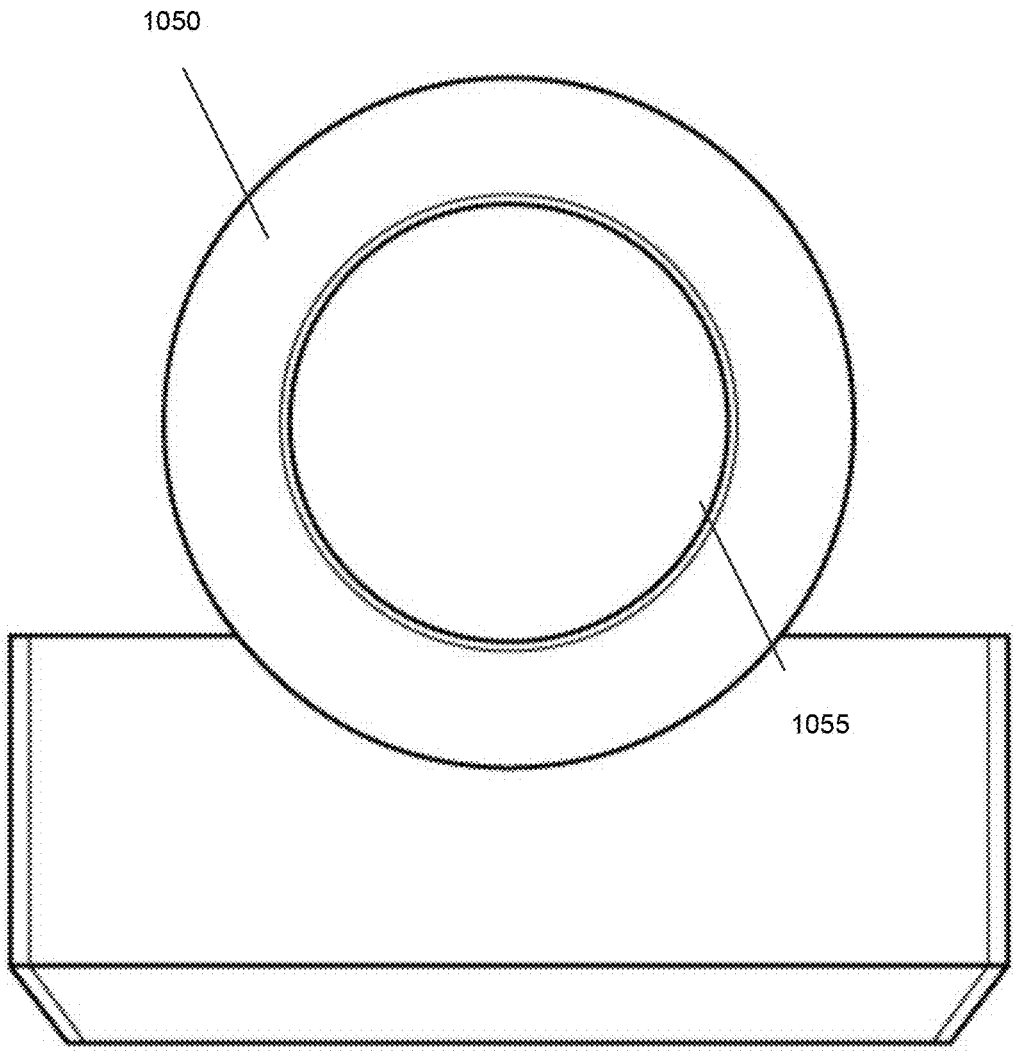

It should be noted that conventional technology does not have a pivot mount in the horizontal and/or vertical direction, and also, does not have a suction cup. The pivoting of light bar 110 allows light bar 110 to be easily affixed to the vehicle. In some embodiment, magnet (not shown) is on the interior of suction cup 950 affixing light bar 110 to the vehicle. The benefit of suction cup 950 or a hybrid combination of magnet/suction cup is for affixing to aluminum bodies of the vehicle or to place tow light 900 on a plastic bumper or glass window. See, for example, FIGS. 10A and 10B illustrating a suction cup 1050 and magnet 1055 for tow light system 100 of FIG. 1, according to an embodiment of the present invention.

In some embodiments, base 940 may rotate or pivot tow light 900 from a first horizontal position to a second horizontal position (i.e., pivot around an x-axis or horizontal plane) and bracket 932 may pivot or move tow light 900 from a first angular position to a second angular position (pivot on a y-axis or a vertical plane). In this embodiment, bracket 932 may include a plurality of grooves to facilitate the change in angular position of tow light 900. In another embodiment, a nut and bolt system may be used to set the angle for the rotation of tow light 90.

Figure 4:
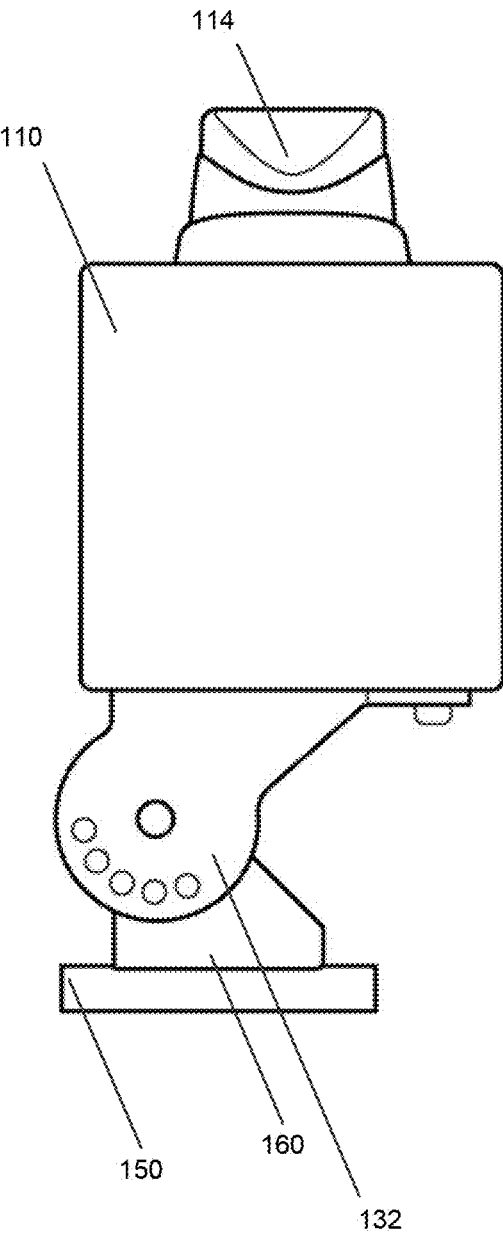
FIG. 4 illustrates a tow light installed on a bracket via a rotating axis with the light mounted on an opposite side of the bracket according to example embodiments.

FIG. 4 illustrates a tow light 114 installed on a bracket via a rotating axis with the light mounted on an opposite side of the bracket, according to an embodiment of the present invention. Referring to FIG. 4, mount configuration includes a base 150 affixed to a bracket 160 affixed to a rotating axis 132. In this example, housing 110 is on an opposite side of the base and bracket.

Figure 5:
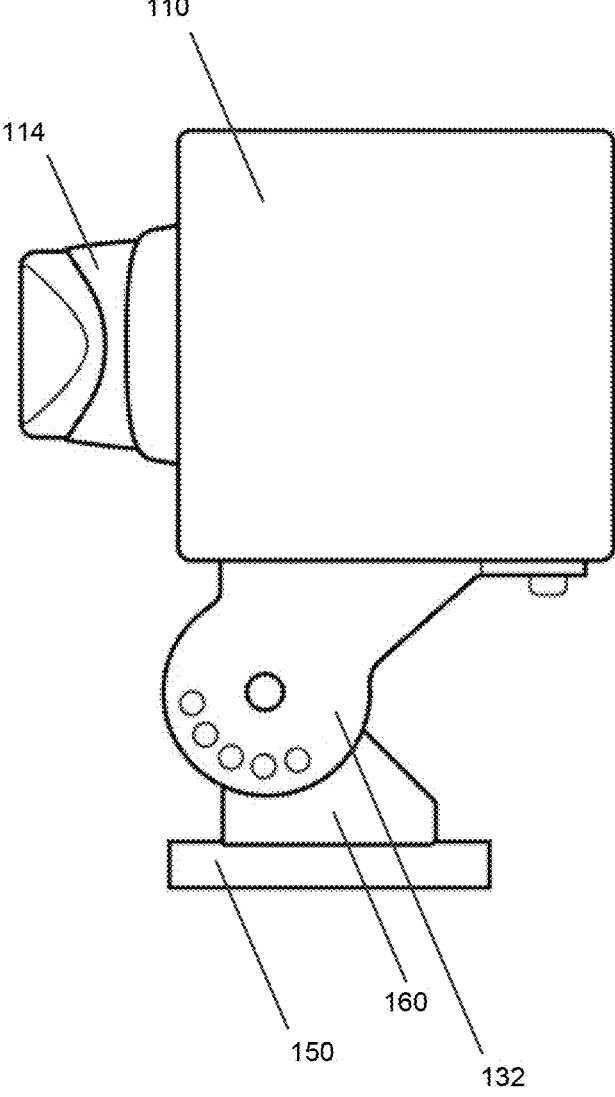
FIG. 5 illustrates a tow light installed on a bracket via a rotating axis with the light mounted on an adjacent side of the bracket, according to an embodiment of the present invention.

FIG. 5 illustrates a tow light 114 installed on a bracket via a rotating axis with the light mounted on an adjacent side of the bracket, according to an embodiment of the present invention. Referring to FIG. 5, the mount configuration includes a base 150 affixed to a bracket 160 affixed to a rotating axis 132. In this example, housing 110 is on an adjacent side of the base and bracket.

Any of the base portions 140, 150, etc., in any of the figures may have a magnet affixed to the bottom portion to provide a way to mount the base on a vehicle body.

Figure 6:
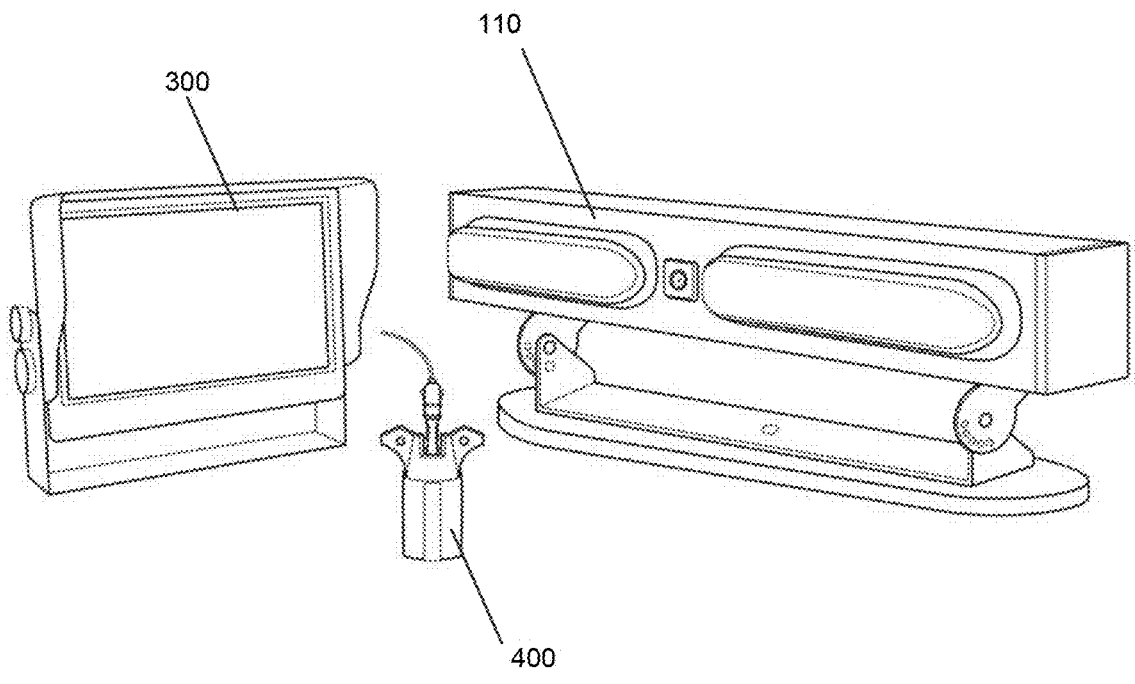
FIG. 6 illustrates multiple components as part of a wireless communication system, according to an embodiment of the present invention.

FIG. 6 illustrates multiple portions as part of a wireless communication system 600, according to an embodiment of the present invention. In some embodiments, monitor 300 is installed to a power source inside the vehicle. Also, in some embodiments, wireless receiver 400 may be installed on a tail gate control interface to receive signals transmitted from a mounted light and camera housing 110. In these embodiments, mounted light and camera housing 110 may provide video data to receiver 400, which forwards the data to the monitor so video from the camera can be viewed by the operator of the vehicle.

The tow light device (i.e., the mounted light and camera housing 110) may operate wirelessly by transmitting signals between monitor 300 and the trailer plug transmitter and the tow light with the camera. The communication protocols may include BLUETOOTH, Wi-Fi, and other wireless communication signaling known to those skilled in the art. The camera may send data to monitor 300, in some embodiments. Not all transmitter plugs are located on a tailgate, which is specific to pickup trucks. For some vehicles, such as a special utility vehicle (SUV), the transmitter may be located on a rear bumper. In these embodiments, the (tow light) transmitter plugs into the tow of the vehicle and transmits the light signals.

Continuing with this embodiment, monitor 300 may use wireless signals, such as Wi-Fi and/or BLUETOOTH signals to communicate the camera. The monitor may display the picture sent from the backup camera on camera housing 110 so the driver can view the content on the display.

With respect to transmitter (or receiver) 400, the plug may be located on a tow of a vehicle and the tow can transmit the signal to the tow light. The tow light may operate brake, left turn, right turn, body running, hazard and reverse lights. The tow light operates on a battery, in some embodiments. It can be both built-in rechargeable and/or disposable batteries.

Figure 7:
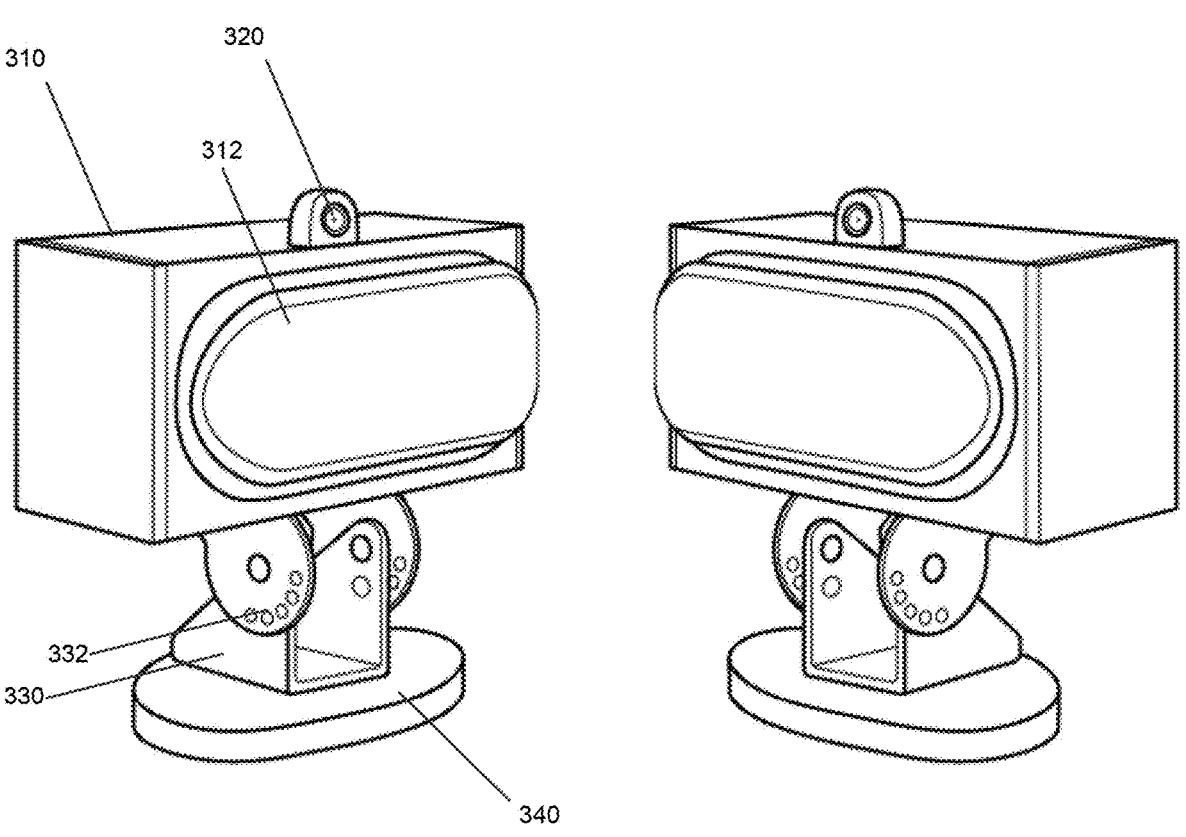
FIG. 7 illustrates a pair of tow lights on respective brackets, according to an embodiment of the present invention.

FIG. 7 illustrates a pair of tow lights (e.g., camera housing 310) on respective brackets (330, 332, 340), according to an embodiment of the present invention. Referring to FIG. 7, the light configuration is described as having a camera housing 310, which includes a light 312. Light 312 is wired to a power source via conduits. These conduits run inside the housing to an exit point or to a battery inside camera housing 310. Light 312 may have a camera 320 disposed above light 312. In these embodiments, camera 320 is wired via a conduit for providing power to a battery and may provide a content feed via one or more conduits disposed inside camera housing 310 or via a wireless transmitter. The camera content is transmitted wirelessly to a receiver mounted in the tailgate control interface of the vehicle and/or a receiver disposed inside the vehicle near a monitor interface inside the vehicle, in certain embodiments.

Camera housing 310 is affixed to a rotating axis of an upper bracket portion 332. Upper bracket portion is affixed to a lower bracket portion of a mount bracket 330, which is affixed to base 340. The wireless tow light with bracket can rotate on an axis and may have no camera. Also, the wireless tow light may have a camera and no bracket rotating about an axis. Yet, in some embodiments, the wireless tow light may rotate about an axis bracket with a camera. Instead of a light bar in the example of FIG. 6, the light is a smaller light with one for a left side of the vehicle and one for the right side, and this example include multiple lights instead of just a single light.

Figure 8A:
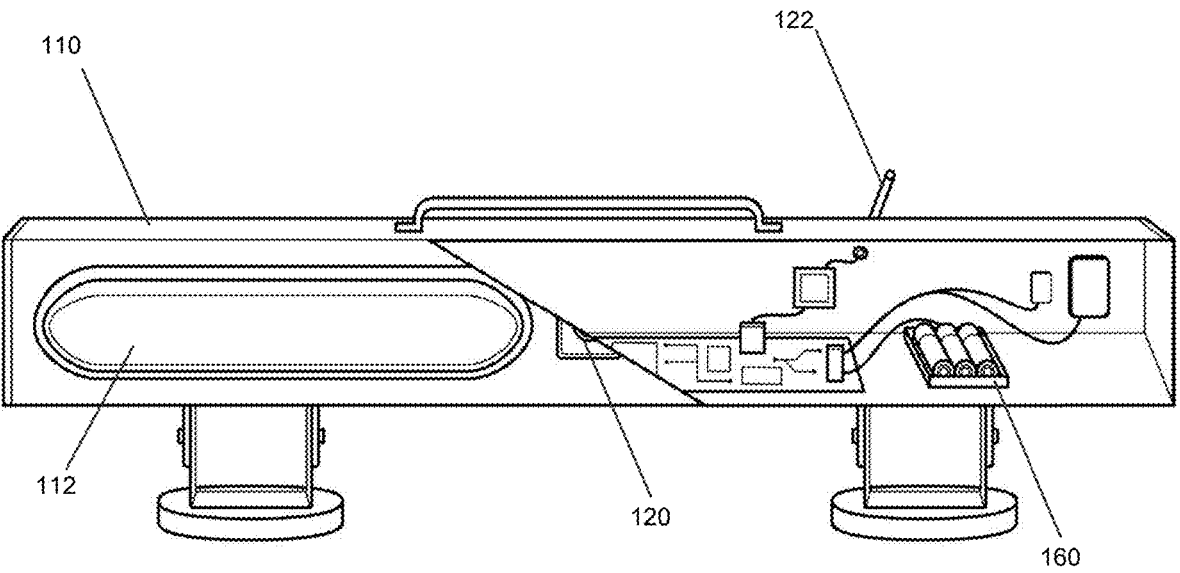
FIGS. 8A and 8B illustrates a front view and a rear view of the tow light configuration, according to an embodiment of the present invention.
Figure 8B:
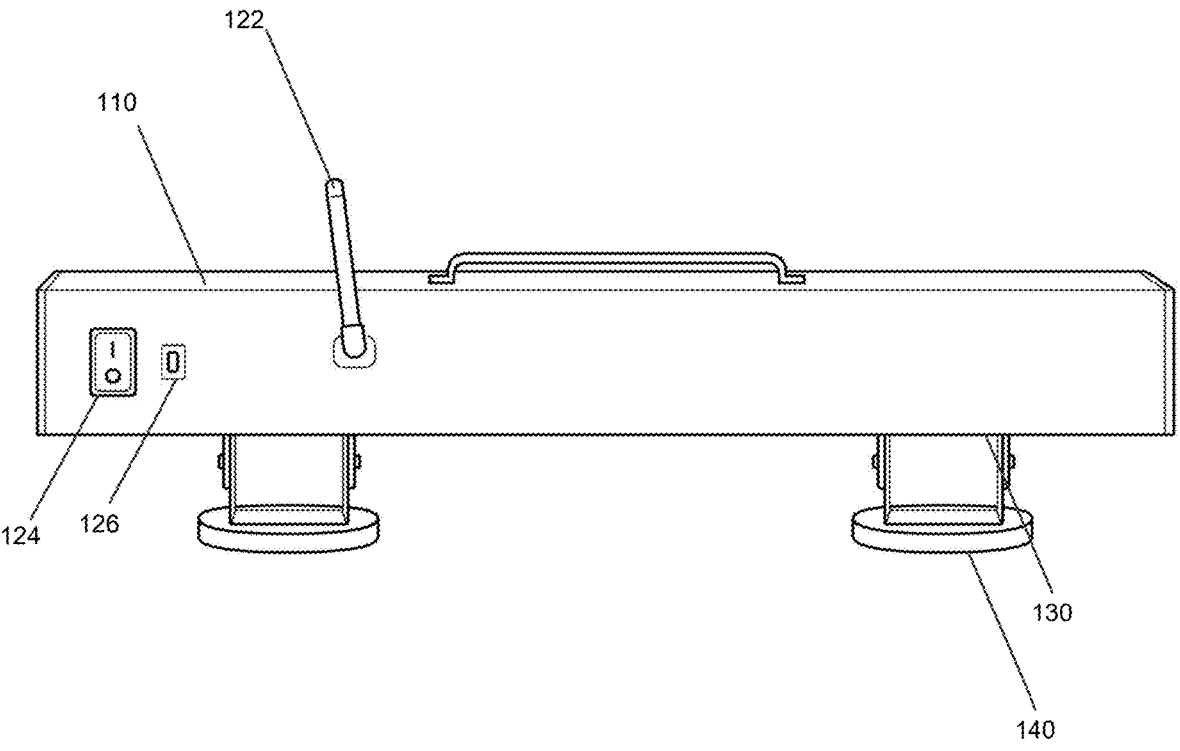

FIGS. 8A and 8B illustrates a front view and a rear view of the tow light, according to an embodiment of the present invention. The front view of tow lights in FIG. 8A shows a cutout illustrating a power source (or battery) 160. In this embodiment, two light 112 (and tow light 114—not shown) are wired to a power source 160 via conduits running inside of housing 110 and configured to remotely turn on or off. Additionally, camera 120 is connected to a power source 160 via conduits running inside of housing 110. The back of bar 110 includes a backup camera antenna 122. The tow light may have a built-in antenna and/or an internal antenna, in certain embodiments. Power button 124 and charging port 126 may enable for the battery to be charged by an external power source (not shown). In certain embodiments, bar 100 may have two different power buttons to control the camera and lights separately, or both could operate on a single button.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A tow light bracket, comprising:
a housing comprising
 one or more tow lights,
 a camera integrated with the one or more tow lights, and a wireless transceiver configured to transmit a wireless signal to, and receive the wireless signal from, a control interface of a vehicle, wherein the wireless signal is configured to activate and deactivate a camera, activate the one or more tow lights for traffic safety; and
one or more brackets affixed to the housing and affixed to a mount, wherein the mount is affixed to a base,
the one or more brackets are configured to pivot on a plane perpendicular to a plane of the housing, and
the one or more tow lights, the camera, and the wireless transceiver are housed inside of the housing and operate via a battery within the housing.

2. The tow light bracket of claim 1, further comprising:
one or more tow lights wired to a power source configured to remotely turn on or off.

3. The tow light bracket of claim 2, wherein
the camera near the one or more tow lights configured to remotely turn on and off, and is connected to a power source.

4. The tow light bracket of claim 1, further comprising:
one or more magnets underneath the base configured to affix the tow light bracket to a vehicle.

5. The tow light bracket of claim 1, further comprising:
one or more suction cups underneath the base configured to affix the tow light bracket to a vehicle.

6. The tow light bracket of claim 1, further comprising:
one or more suction cups comprising a corresponding one or more magnets underneath the one or more suction cups, wherein
the combination of the one or more suction cups and the corresponding one or more magnets are configured to affix the tow light bracket to the vehicle.

7. A tow light bracket, comprising:
a housing comprising
 one or more lights,
 a camera integrated with the one or more tow lights, and
 a wireless transceiver configured to transmit a wireless signal to, and receive the wireless signal from, a control interface of a vehicle, wherein the wireless signal is configured to activate and deactivate a camera, activate the one or more tow lights for traffic safety;
an upper bracket portion comprising respective rotating axes to permit the housing to maneuver from a first position to a second position; and
a lower bracket portion affixed to the upper bracket portion to provide a rotating axis for the housing to maneuver into the position, wherein
the one or more tow lights, the camera, and the wireless transceiver are housed inside of the housing and operate via a battery within the housing.

8. The tow light bracket of claim 7, wherein the upper bracket portion pivots the housing from a first angular position to a second angular position.

9. The tow light bracket of claim 7, further comprising:
a mount affixed to the lower bracket portion, configured to pivot the housing from a first horizontal position to a second horizontal position.

10. The tow light bracket of claim 7, further comprising:
a plurality of brackets within the upper bracket portion facilitating movement of the housing from the first position to the second position.

* * * * *